(12) United States Patent
Li et al.

(10) Patent No.: US 9,983,390 B2
(45) Date of Patent: May 29, 2018

(54) PHOTOGRAPHIC OBJECTIVE LENS

(71) Applicant: HAN'S LASER TECHNOLOGY INDUSTRY GROUP CO., LTD., Shenzhen (CN)

(72) Inventors: Jiaying Li, Shenzhen (CN); Chaoming Zhou, Shenzhen (CN); Bo Sun, Shenzhen (CN); Yunfeng Gao, Shenzhen (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 23 days.

(21) Appl. No.: 15/328,876

(22) PCT Filed: Sep. 10, 2014

(86) PCT No.: PCT/CN2014/086190
§ 371 (c)(1),
(2) Date: Jan. 24, 2017

(87) PCT Pub. No.: WO2016/037323
PCT Pub. Date: Mar. 17, 2016

(65) Prior Publication Data
US 2017/0219804 A1    Aug. 3, 2017

(51) Int. Cl.
*G02B 9/64* (2006.01)
*G02B 13/06* (2006.01)
*G02B 13/00* (2006.01)

(52) U.S. Cl.
CPC .............. *G02B 13/06* (2013.01); *G02B 9/64* (2013.01); *G02B 13/0045* (2013.01)

(58) Field of Classification Search
CPC ....... G02B 9/64; G02B 13/0045; G02B 13/06
(Continued)

(56) References Cited

U.S. PATENT DOCUMENTS 4,464,023 A * 8/1984 Kato ................. G02B 15/163
359/740
4,508,434 A * 4/1985 Ogawa ................ G02B 13/02
359/745
(Continued)

FOREIGN PATENT DOCUMENTS

CN          1383015 A     12/2002
CN        102436058 A      5/2012
(Continued)

OTHER PUBLICATIONS

International Search Report dated Jun. 12, 2015 for application No. PCT/CN2014/086190.

*Primary Examiner* — Nicholas R Pasko
(74) *Attorney, Agent, or Firm* — Platinum Intellectual Property LLP

(57) ABSTRACT

A photographic objective lens includes seven lenses, wherein a first lens is a meniscus lens, a second lens is a meniscus lens, a third lens is a meniscus lens, a fourth lens is a biconcave lens, a fifth lens is a biconvex lens, a sixth lens is a biconvex lens, a seventh lens is a meniscus lens. The first lens has a first curved surface and a second curved surface, the second lens has a third curved surface and a fourth curved surface, the third lens has a fifth curved surface and a sixth curved surface, the fourth lens has a seventh curved surface and a eighth curved surface, the fifth lens has a ninth curved surface and a tenth curved surface, the sixth lens has a eleventh curved surface and a twelfth curved surface, and the seventh lens has a thirteenth curved surface and a fourteenth curved surface; wherein the first curved surface to the fourteenth curved surface are sequentially arranged along a transmission direction of incident light.

3 Claims, 6 Drawing Sheets

(58) Field of Classification Search
USPC .................................... 359/657, 751, 755
See application file for complete search history.

(56) References Cited

U.S. PATENT DOCUMENTS

| | | | | |
|---|---|---|---|---|
| 4,702,568 A | * | 10/1987 | Okudaira | G02B 9/62 359/755 |
| 6,549,343 B2 | * | 4/2003 | Yoneyama | G02B 13/02 359/745 |
| 2013/0194678 A1 | | 8/2013 | Suzuki et al. | |

FOREIGN PATENT DOCUMENTS

| | | |
|---|---|---|
| CN | 103837974 A | 6/2014 |
| JP | 2006301393 A | 11/2006 |

* cited by examiner

Spatial frequencies (units: 1p/mm)

PHOTOGRAPHIC OBJECTIVE LENS

RELATED APPLICATIONS

This application is a United States National Stage Application filed under 35 U.S.C 371 of PCT Patent Application Ser. No. PCT/CN2014/086190, filed Sep. 10, 2014, the disclosure of all of which are hereby incorporated by reference in their entirety.

FIELD OF THE INVENTION

The present disclosure relates to the field of applied optics, and more particularly relates to a photographic objective lens.

BACKGROUND OF THE INVENTION

The photographic objective lens simulating fisheyes, which is also referred to "fisheye" photographic objective lens, is a photographic objective lens with a large relative aperture. According to the optical theory, the field of view of the photographic objective lens can be 180°, i.e. all sceneries in front of the photographic objective are captured in the field of view of the objective lens.

Assuming that the sceneries in front of the semi-spherical surface of the objective lens are totally captured and imaged on the image plane, it can be inferred that, the object space in front of the objective lens is a semi-spherical space while the image surface is a circular surface. At this time, the formula $\eta=f\tan\alpha$ in the geometric optics is no longer applicable, because when $\alpha$ in $\tan\alpha$ is 90°, $\tan\alpha \to \infty$, i.e. $\eta \to \infty$, which is impossible in practice. Then the practical optical system distortion value of the optical theory of the objective lens is 100%, in which $\eta \approx f$, such that the focal length f of the optical system determines that diameter of the image of the object surface should be 2f, such a photographic objective lens usually has a great volume.

SUMMARY

Therefore, it is necessary to provide a photographic objective lens having a large relative aperture and a small volume.

A photographic objective lens includes a first lens, a second lens, a third lens, a fourth lens, a fifth lens, a sixth lens, and a seventh lens, which are coaxially configured along a transmission direction of incident light, wherein the first lens is a meniscus lens, the second lens is a meniscus lens, the third lens is a meniscus lens, the fourth lens is a biconcave lens, the fifth lens is a biconvex lens, the sixth lens is a biconvex lens, and the seventh lens is a meniscus lens; wherein the first lens has a first curved surface and a second curved surface, the second lens has a third curved surface and a fourth curved surface, the third lens has a fifth curved surface and a sixth curved surface, the fourth lens has a seventh curved surface and a eighth curved surface, the fifth lens has a ninth curved surface and a tenth curved surface, the sixth lens has a eleventh curved surface and a twelfth curved surface, the seventh lens has a thirteenth curved surface and a fourteenth curved surface; the first curved surface to the fourteenth curved surface are sequentially arranged along the transmission direction of the incident light; wherein radii of curvature of the first curved surface to the fourteenth curved surface are 200 mm, 15 mm, 16 mm, 10 mm, 17 mm, 70 mm, −190 mm, 30 mm, 22 mm, −26 mm, −60 mm, −15 mm, −10 mm, and −60 mm; wherein central thicknesses of the first lens to the seventh lens are 4 mm, 2 mm, 5 mm, 2 mm, 5 mm, 5 mm, and 2 mm.

In one embodiment, the first lens to the seventh lens have ratios of refractive index to Abbe number of 1.62/60, 1.62/60, 1.64/35, 1.75/30, 1.62/60, 1.62/60, and 1.75/30.

In one embodiment, an interval between the second curved surface and the third curved surface is 30 mm, an interval between the fourth curved surface and the fifth curved surface is 2 mm, an interval between the sixth curved surface and the seventh curved surface is 6 mm, an interval between the eighth curved surface and the ninth curved surface is 2 mm, an interval between the tenth curved surface and the eleventh curved surface is 1 mm, an interval between the twelfth curved surface and the thirteenth curved surface is 1.5 mm.

In one embodiment, tolerance ranges of the radius of curvature, central thicknesses, ratios of the refractive index to the abbe number, and intervals are 5%.

The foregoing photographic objective lens consists of seven lenses, which has a large relative aperture and a small volume, while the variety of optical materials for manufacturing a photographic objective lens is greatly simplified.

BRIEF DESCRIPTION OF THE DRAWINGS

The above objects, features and advantages of the present disclosure will become more apparent by describing in detail embodiments thereof with reference to the accompanying drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

In order to make the above objects, features and advantages of the present disclosure become more apparent, the specific embodiments will be described in detail in combination with the accompanying drawings. Numerous specific details are described hereinafter in order to facilitate a thorough understanding of the present disclosure. The various embodiments of the disclosure may, however, be embodied in many different forms and should not be construed as limited to the specific embodiments set forth hereinafter, and people skilled in the art can make similar modifications without departing from the spirit of the present disclosure.

Figure 1:
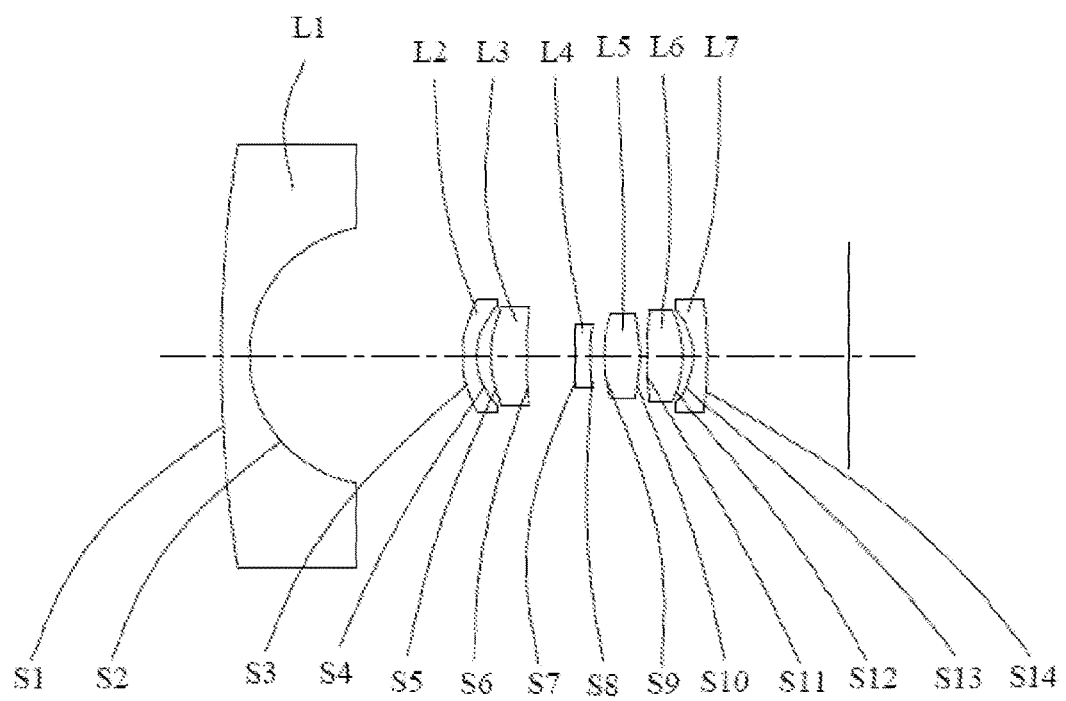
FIG. 1 is a schematic diagram of a photographic objective lens according to an embodiment.

FIG. 1 is a schematic diagram of the photographic objective lens according to an embodiment, for illustrative purpose, only portions related to the implementation of the disclosure are shown.

As shown in FIG. 1, a photographic objective lens according to an embodiment includes a first lens L1, a second lens L2, a third lens L3, a fourth lens L4, a fifth lens L5, a sixth lens L6, and a seventh lens L7, which are coaxially configured along a transmission direction of incident light.

In the photographic objective lens, the propagation direction of the light is from the left side to the right side of the drawing. The positive or negative curvature radius of the lens is determined by taking a relative positional relationship between an intersection point of the curved surface and the principal optical axis and a center of the spherical surface of the curved surface. If the center of the spherical surface is in the left of the intersection point, the radius of curvature has a negative value, if, on the other hand, the center of the spherical surface is in the right of the intersection point, the radius of curvature has a positive value.

Figure 2:
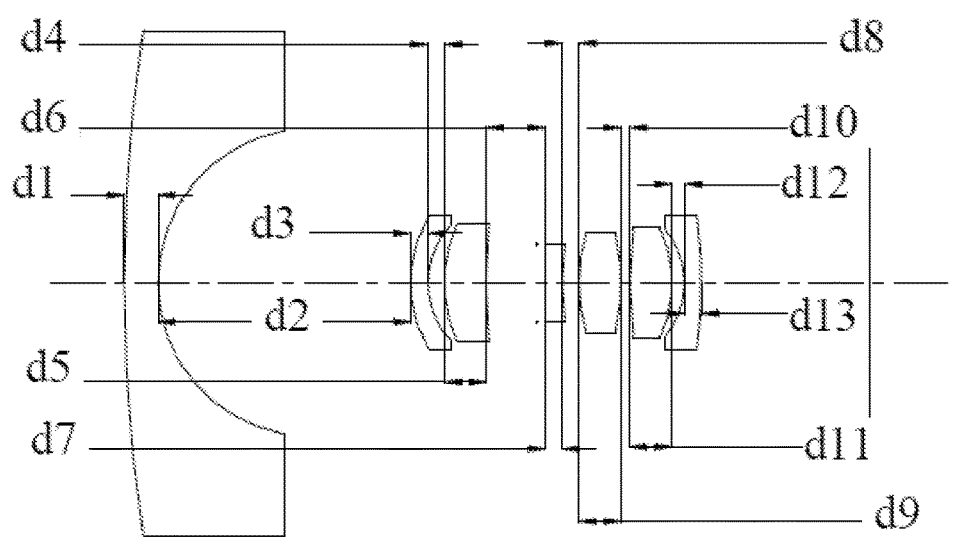
FIG. 2 shows intervals between the each components of the photographic objective lens shown of FIG. 1.

As shown in FIG. 1 and FIG. 2, the first lens L1 is a meniscus lens, which has a first curved surface S1 and a second curved surface S2. The first curved surface S1 is a convex surface facing an object side, the radius of curvature of which is 200 mm. The second curved surface S2 is also a convex surface facing the object side, the radius of curvature of which is 15 mm. The first lens L1 has a central thickness d1 (i.e. a thickness of the first lens L1 on an optical axis) of 4 mm. The first lens L1 has a ratio of the refractive index Nd1 to the abbe number Vd1 of 1.62/60. The first lens L1 has an outer diameter of Φ60 mm. The parameters above of the first lens L1 are not constant, and there exists a tolerance range of 5%, i.e. those parameters can vary within a range of ±5%.

The second lens L2 is a meniscus lens, which has a third curved surface S3 and a fourth curved surface S4. The third curved surface S3 is a convex surface facing the object side, the radius of curvature of which is 16 mm. The fourth curved surface S4 is also a convex surface facing the object side, the radius of curvature of which is 10 mm. The second lens L2 has a central thickness d3 of 2 mm. The second lens has a ratio of the refractive index Nd2 to the abbe number Vd2 of L2 of 1.62/60. The second lens L2 has an outer diameter of Φ16 mm. The parameters above of the second lens L2 has a tolerance range of 5%.

The third lens L3 is a meniscus lens, which has a fifth curved surface S5 and a sixth curved surface S6. The fifth curved surface S5 is a convex surface facing the object side, the radius of curvature of which is 17 mm. The sixth curved surface S6 is also a convex surface facing the object side, the radius of curvature of which is 70 mm. The third lens L3 has a central thickness d5 of 5 mm. The third lens L3 has a ratio of the refractive index Nd3 to the abbe number Vd3 of 1.64/35. The third lens L3 has an outer diameter of Φ14 mm. The parameters above of the third lens L3 has a tolerance range of 5%.

The fourth lens L4 is a biconcave lens, which has a seventh curved surface S7 and a eighth curved surface S8. The seventh curved surface S7 is a convex surface facing an image side, the radius of curvature of which is −190 mm. The eighth curved surface S8 is a convex surface facing the seventh curved surface S7, the radius of curvature of which is 30 mm. The fourth lens L4 has a ratio of the refractive index Nd4 to the abbe number Vd4 of 1.75/30. The fourth lens L4 has a central thickness d7 of 2 mm. The fourth lens L4 has an outer diameter of Φ9 mm. The parameters above of the fourth lens L4 has a tolerance range of 5%.

The fifth lens L5 is a biconvex lens, which has a ninth curved surface S9 and a tenth curved surface S10. The ninth curved surface S9 is a convex surface facing the object side, the radius of curvature of which is 22 mm. The tenth curved surface S10 is a convex surface opposite to the ninth curved surface S9, the radius of curvature of which is −26 mm. The fifth lens L5 has a ratio of the refractive index Nd5 to the abbe number Vd5 of 1.62/60. The fifth lens L5 has a central thickness d9 of 5 mm. The fifth lens L5 has an outer diameter of Φ12 mm. The parameters above of the fifth lens L5 has a tolerance range of 5%.

The sixth lens L6 is a biconvex lens, which has the eleventh curved surface S11 and a twelfth curved surface S12. The eleventh curved surface S11 is a convex surface facing the image side, the radius of curvature of which is −60 mm. The twelfth curved surface S12 is a convex surface opposite to the eleventh curved surface S11, the radius of curvature of which is −15 mm. The sixth lens L6 has a ratio of the refractive index Nd6 to the abbe number Vd6 of 1.62/60. The sixth lens L6 has an outer diameter of Φ13 mm. The parameters above of the sixth lens L6 has a tolerance range of 5%.

The seventh lens L7 is a meniscus lens, which has a thirteenth curved surface S13 and a fourteenth curved surface S14. The thirteenth curved surface S13 is a convex surface facing the image side, the radius of curvature of which is −10 mm. The fourteenth curved surface S14 is also a convex surface facing the image side, the radius of curvature of which is −60 mm. The seventh lens L7 has a ratio of the refractive index Nd7 to the abbe number Vd7 of 1.75/30. The seventh lens L7 has an outer diameter of Φ14 mm. The parameters above of the seventh lens L7 has a tolerance range of 5%.

The first curved surface Si to the fourteenth curved surface S14 are sequentially arranged along the transmission direction of the incident light.

In one embodiment, an interval d2 between a light outgoing plane (the second curved surface S2) of the first lens L1 and a incident surface (the third curved surface S3) of the second lens L2 on the optical axis is 30 mm, and a tolerance range of which is 5%. An interval d4 between the light outgoing plane (the fourth curved surface S4) of the second lens L2 and the incident surface (the fifth curved surface S5) of the third lens L3 on the optical axis is 2 mm, and a tolerance range of which is 5%. An interval d6 between the light outgoing plane (the sixth curved surface S6) of the third lens L3 and the incident surface (the seventh curved surface S7) of the fourth lens L4 on the optical axis is 6 mm, and a tolerance range of which is 5%. An interval d8 between the light outgoing plane (the eighth curved surface S8) of the fourth lens L4 and the incident surface (the ninth curved surface S9) of the fifth lens L5 on the optical axis is 2 mm, and a tolerance range of which is 5%. An interval d10 between the light outgoing plane (the tenth curved surface S10) of fifth lens L5 and the incident surface (the eleventh curved surface S11) of the sixth lens L6 on the optical axis is 1 mm, and a tolerance range of which is 5%. An interval d12 between the light outgoing plane (the twelfth curved surface S12) of the sixth lens L6 and the incident surface (the thirteenth curved surface S13) of the seventh lens L7 on the optical axis is 1 mm, and a tolerance range of which is 5%.

Figure 3A:
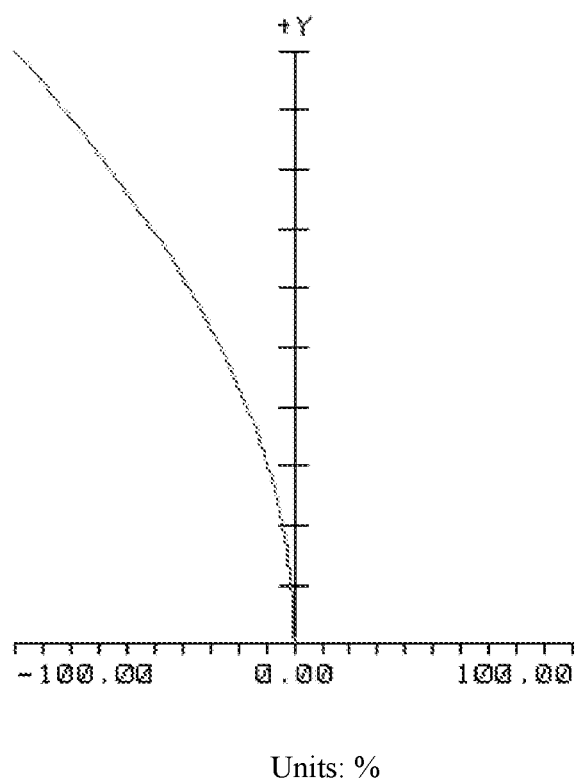
FIG. 3 is a fine beam aberration diagram of the photographic objective lens according to an embodiment.
Figure 3B:
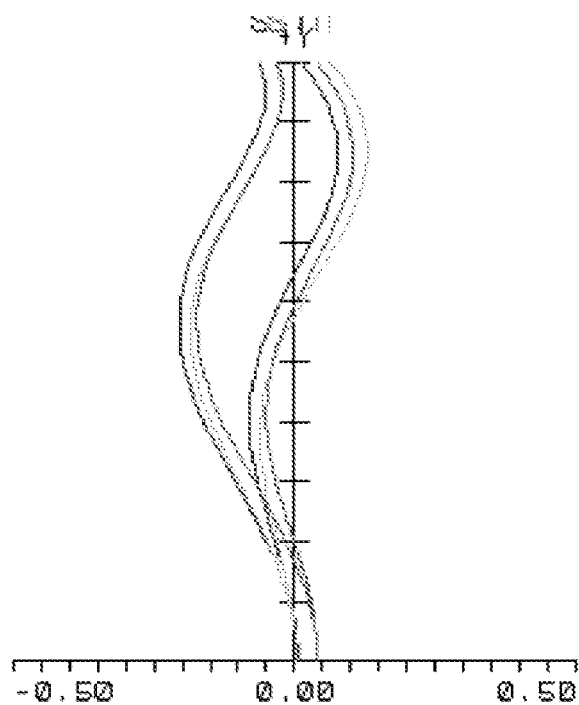
Figure 4:
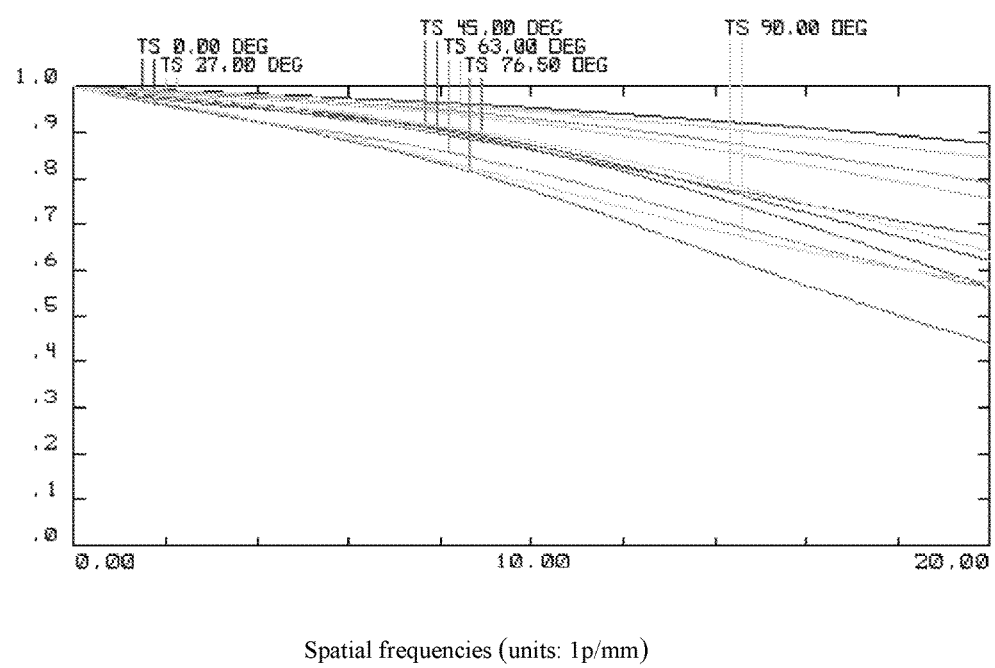
FIG. 4 is a graphic diagram showing modulation transfer function M.T.F of the photographic objective lens according to an embodiment.
Figure 5:
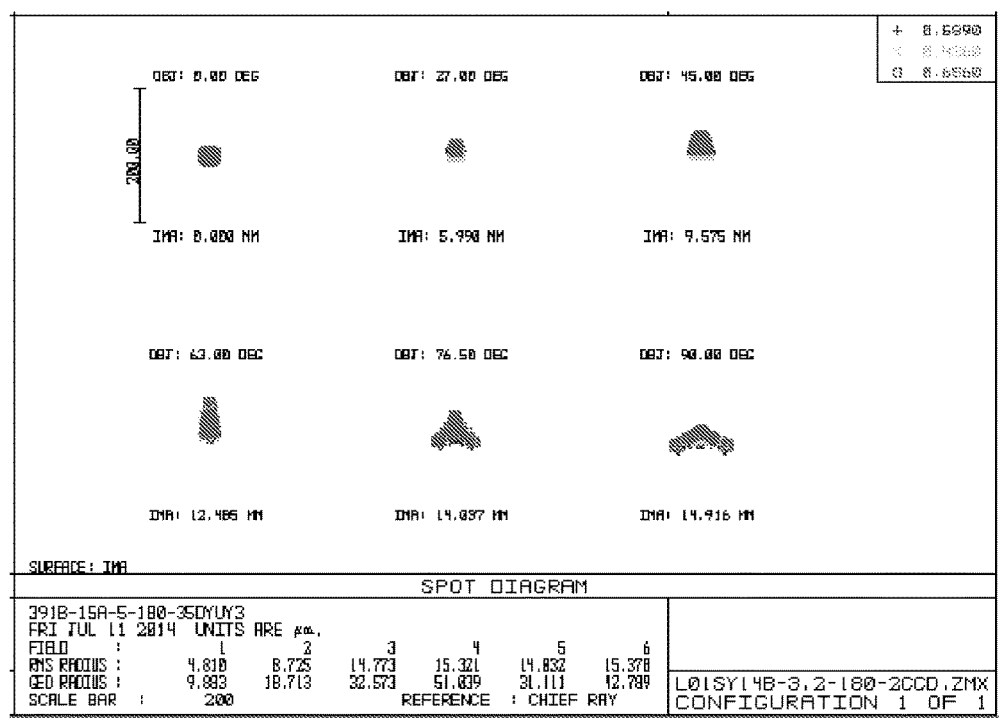
FIG. 5 is a graphic diagram showing geometric aberration of the photographic objective lens according to an embodiment.

FIG. 3 to FIG. 5 show a fine beam aberration diagram, a modulation transfer function graph and a geometrical aberration diagram of the foregoing geographic objective lens, respectively, The parameters of the geographic objective lens are as follows:

$f=14$ mm, $2\eta=30$, $D/f=1: 3.2$, $2\omega=180°$, $\lambda=656$ nm~589 nm~436 nm, $L=22$.

As shown in FIG. 3A and FIG. 3B, the distortion of the geographic objective lens is completely consistent with the theory, when the field of view α=90°, Dist=100%, the astigmatic curve has reached the ideal state.

As shown in FIG. 4, when the MTF of a photographic objective lens is the worst, i.e. when the resolution is 20 line pairs per millimeter, MTF ≈0.5. It should be noted that since α=90°, the entrance pupil at the edge of a photographic objective lens is much smaller than the entrance pupil in the central of a photographic objective lens, this is due to that the MTF of the edge is smaller than the MTF of the central of the image, which is possible in theory.

As shown in FIG. 5, the astigmatism circle of the whole field of view is about 0.01 mm, which has reached the ideal value.

The photographic objective lens consists of seven lenses, which has a large relative aperture and a small volume.

The foregoing implementations are merely specific embodiments of the present disclosure, but are not intended to limit the protection scope of the present disclosure. It should be noted that any variation or replacement readily figured out by persons skilled in the art within the technical scope disclosed in the present disclosure shall all fall within the protection scope of the present disclosure. Therefore, the protection scope of the present disclosure shall be subject to the protection scope of the claims.

What is claimed is:

1. A photographic objective lens, comprising a first lens, a second lens, a third lens, a fourth lens, a fifth lens, a sixth lens, and a seventh lens, which are coaxially configured along a transmission direction of incident light, wherein the first lens is a meniscus lens, the second lens is a meniscus lens, the third lens is a meniscus lens, the fourth lens is a biconcave lens, the fifth lens is a biconvex lens, the sixth lens is a biconvex lens, and the seventh lens is a meniscus lens;

wherein the first lens has a first curved surface and a second curved surface, the second lens has a third curved surface and a fourth curved surface, the third lens has a fifth curved surface and a sixth curved surface, the fourth lens has a seventh curved surface and a eighth curved surface, the fifth lens has a ninth curved surface and a tenth curved surface, the sixth lens has a eleventh curved surface and a twelfth curved surface, the seventh lens has a thirteenth curved surface and a fourteenth curved surface; the first curved surface to the fourteenth curved surface are sequentially arranged along the transmission direction of the incident light;

wherein radii of curvature of the first curved surface to the fourteenth curved surface are 200 mm, 15 mm, 16 mm, 10 mm, 17 mm, 70 mm, −190 mm, 30 mm, 22 mm, −26 mm, −60 mm, −15 mm, −10 mm, and −60 mm; and wherein central thicknesses of the first lens to the seventh lens are 4 mm, 2 mm, 5 mm, 2mm, 5 mm, 5 mm, and 2 mm.

2. The photographic objective lens of claim 1, wherein the first lens to the seventh lens have ratios of refractive index to Abbe number of 1.62/60, 1.62/60, 1.64/35, 1.75/30, 1.62/60, 1.62/60, and 1.75/30.

3. The photographic objective lens of claim 1, wherein an interval between the second curved surface and the third curved surface is 30 mm, an interval between the fourth curved surface and the fifth curved surface is 2 mm, an interval between the sixth curved surface and the seventh curved surface is 6 mm, an interval between the eighth curved surface and the ninth curved surface is 2 mm, an interval between the tenth curved surface and the eleventh curved surface is 1 mm, an interval between the twelfth curved surface and the thirteenth curved surface is 1.5 mm.

* * * * *